(12) United States Patent
Glass

(10) Patent No.: US 6,662,006 B2
(45) Date of Patent: *Dec. 9, 2003

(54) METHOD AND APPARATUS FOR PROVIDING CALLING NUMBER IDENTIFICATION ALIAS IN COMMUNICATIONS SYSTEM

(75) Inventor: David R. Glass, Redmond, WA (US)

(73) Assignee: AT&T Wireless Services, Inc., Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/188,521

(22) Filed: Jul. 2, 2002

(65) Prior Publication Data

US 2002/0168968 A1 Nov. 14, 2002

Related U.S. Application Data

(63) Continuation of application No. 08/991,937, filed on Dec. 16, 1997.

(51) Int. Cl.[7] .............................. H04Q 7/20; H04M 3/42; H04M 15/06
(52) U.S. Cl. ........................ 455/415; 455/414; 455/417; 455/461; 379/142.06
(58) Field of Search ................................. 455/414, 415, 455/417, 418, 461, 414.1, 419, 420, 432.3; 379/201.02, 201.03, 201.07, 201.08, 207.14, 207.15, 142.03, 142.06

(56) References Cited

U.S. PATENT DOCUMENTS

| 5,274,699 A | * 12/1993 | Ranz ............................ 379/62 |
| 5,465,295 A | 11/1995 | Furman |
| 5,903,636 A | * 5/1999 | Malik .......................... 379/207 |
| 6,038,305 A | * 3/2000 | McAllister et al. ......... 379/207 |
| 6,094,478 A | * 7/2000 | Shepherd et al. ........... 379/211 |
| 6,130,935 A | * 10/2000 | Shaffer et al. .............. 379/127 |
| 6,343,120 B1 | 1/2002 | Rhodes |

* cited by examiner

*Primary Examiner*—William Trost
*Assistant Examiner*—Meless Zewdu
(74) *Attorney, Agent, or Firm*—Perkins Coie LLP

(57) ABSTRACT

A method and apparatus to provide a calling number identifier alias in a communications system having a wireless telephone associated with a wired telephone number, such as a wireless office service communications system. When a telephone call is placed from the wireless telephone, an alias database is searched to determine the associated wired telephone number. The telephone number of the wired telephone is used as an alias for the purpose of the calling number identifier.

19 Claims, 3 Drawing Sheets

METHOD AND APPARATUS FOR PROVIDING CALLING NUMBER IDENTIFICATION ALIAS IN COMMUNICATIONS SYSTEM

CROSS REFERENCE TO RELATED APPLICATIONS

The present application is a continuation of U.S. application Ser. No. 08/991,937 filed Dec. 16, 1997, incorporated herein in its entirety by reference.

FIELD OF THE INVENTION

The invention relates to communication systems. More particularly, the invention relates to a method and apparatus for providing a calling number identifier alias in a communications system.

BACKGROUND OF THE INVENTION

Some telephone communications systems, such as the Wireless Office Service (WOS) communications system offered by AT&T, let a subscriber use a wireless telephone, such as a cellular phone, interchangeably with a wired telephone. The wireless telephone and the wired telephone have a fixed correspondence and the service can be configured to have the wireless telephone act as a subscriber's wired telephone. Both the wireless telephone number and the wired telephone number are associated with the subscriber by the service. In a WOS communication system, the wired telephone is generally coupled directly to a Private Branch Exchange (PBX), while the wireless telephone is coupled directly to a wireless switch.

Because many WOS subscribers use their wireless telephone as their office telephone while both in and out of their office, they configure the PBX such that an incoming call placed to the wired telephone will be automatically delivered to the wireless telephone. Thus, many WOS subscribers associate a single telephone number with both the wired telephone and the wireless telephone. Moreover, a person who contacts a subscriber, such as a customer, will also associate the single telephone number with both the wired telephone and the wireless telephone. To avoid confusion, a subscriber may "publish" only the single telephone number on business cards, advertisements and the like. Some subscribers may keep the wireless telephone number private for other reasons, such as to reserve the number for use in emergency situations.

A problem arises, however, when a subscriber uses the wireless phone to call a party who uses a Calling Number Identifier (CNI) system, also known as "caller ID," which displays the telephone number of the calling party. This is generally done by having a terminating Local Exchange Carrier (LEC) switch recognize that a call is being placed to a caller ID subscriber. The terminating switch can optionally send a query to a name database which sends back a name associated with the calling party number. The terminating switch provides the calling party number, and optionally the name of the calling party, to the receiving phone.

When a subscriber makes a telephone call from the wired telephone, the PBX typically uses published telephone number as the CNI. When a subscriber makes a telephone call from the wireless telephone, the wireless switch uses the Mobile Identification Number (MIN) of the wireless phone as the CNI. In this case, the called party will not see the familiar telephone number of the subscriber's wired telephone, but instead will see a number associated with the subscriber's wireless telephone. This might confuse the called party as to who is really calling them, and the party may not even answer the unidentifiable call.

SUMMARY OF THE INVENTION

The disadvantages of the art are alleviated to a great extent by the method and apparatus to provide a CNI alias in a communications system having a wireless telephone associated with a wired telephone number, such as a WOS communications system. When a telephone call is placed from the wireless telephone, an alias database is searched to determine the associated wired telephone number. The telephone number of the wired telephone is used as an alias for the purpose of the CNI.

In one embodiment of the present invention, a wireless switch coupled to a communications network is configured to route a telephone call from a wireless telephone to the communications network. A Service Control Point (SCP) is coupled to the wireless switch and is also coupled to an alias database that associates a MIN representing the wireless telephone with a telephone number representing a wired telephone. The SCP uses the telephone number of the wired telephone as the a CNI alias for the call from the wireless telephone.

With these and other advantages and features of the invention that will become hereinafter apparent, the nature of the invention may be more clearly understood by reference to the following detailed description of the invention, the appended claims and to the several drawings attached herein.

DETAILED DESCRIPTION

Figure 1:
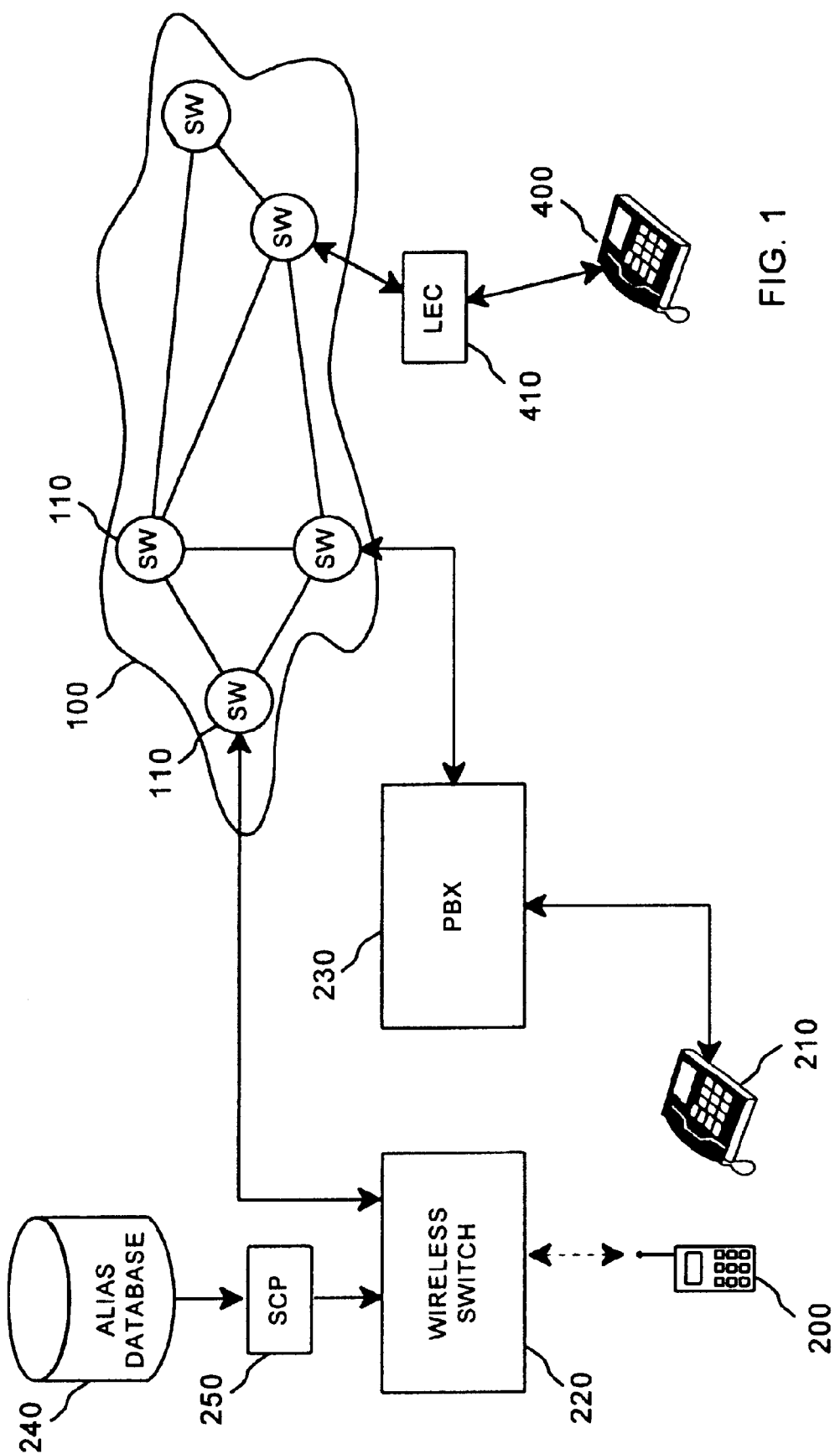
FIG. 1 is a block diagram including elements of a communications network suitable for practicing an embodiment of the present invention.

The present invention is directed to a method and apparatus for providing a CNI alias in a communications system. Referring now in detail to the drawings wherein like parts are designated by like reference numerals throughout, there is illustrated in FIG. 1 a block diagram including elements of the Public Switched Telephone Network (PSTN), a communications network suitable for practicing an embodiment of the present invention. A wireless telephone 200 is associated with a wired telephone 210, such as in a WOS communications system. The wired telephone 210 is coupled to a communications network 100 through a PBX 230. A wireless switch 220 in communication with the wireless phone 200 is also coupled to the communications network 100. A telephone call from either the wired telephone 210 or the wireless telephone 200 can be routed to a called telephone 400 through a number of communications switches 110 in the communications network 100 and a LEC 410. The wireless switch 220 may be coupled to the communications network 100 at the same communications switch 110 as the PBX 230, or a different communications switch 110. Although not shown in FIG. 1, the wireless switch may also be coupled directly to the PBX 230.

In the embodiment of the invention shown in FIG. 1, a CNI alias system is provided at an intelligent network node 250, such as an SCP, coupled to the wireless switch 220. It should be noted, however, that a CNI alias system could be associated with other nodes in the network between the wireless telephone 200 and the called telephone 400, such as, for example, the PBX 230, a communications switch 110, a Mobile Telephone Switching Office (MTSO) or a Mobile Switching Center (MSC), not shown in FIG. 1.

When a subscriber places a call using a wireless telephone 200, the SCP 250 associates the telephone number of the wired telephone 210 with the call using an alias database 240.

Although an embodiment of the present invention is described with respect to providing a CNI alias for a "subscriber," it will be understood that the system could also be implemented to provide a CNI alias without requiring a subscription. The telephone number of the wired telephone 210, or published number, is then sent to the called telephone 400 as a CNI alias. If the called party is using caller ID, the telephone number of the wired telephone 210 will therefore be displayed, even though the call was made from the wireless telephone 200, and the called party will recognize that the subscriber is the calling party.

Figure 2:
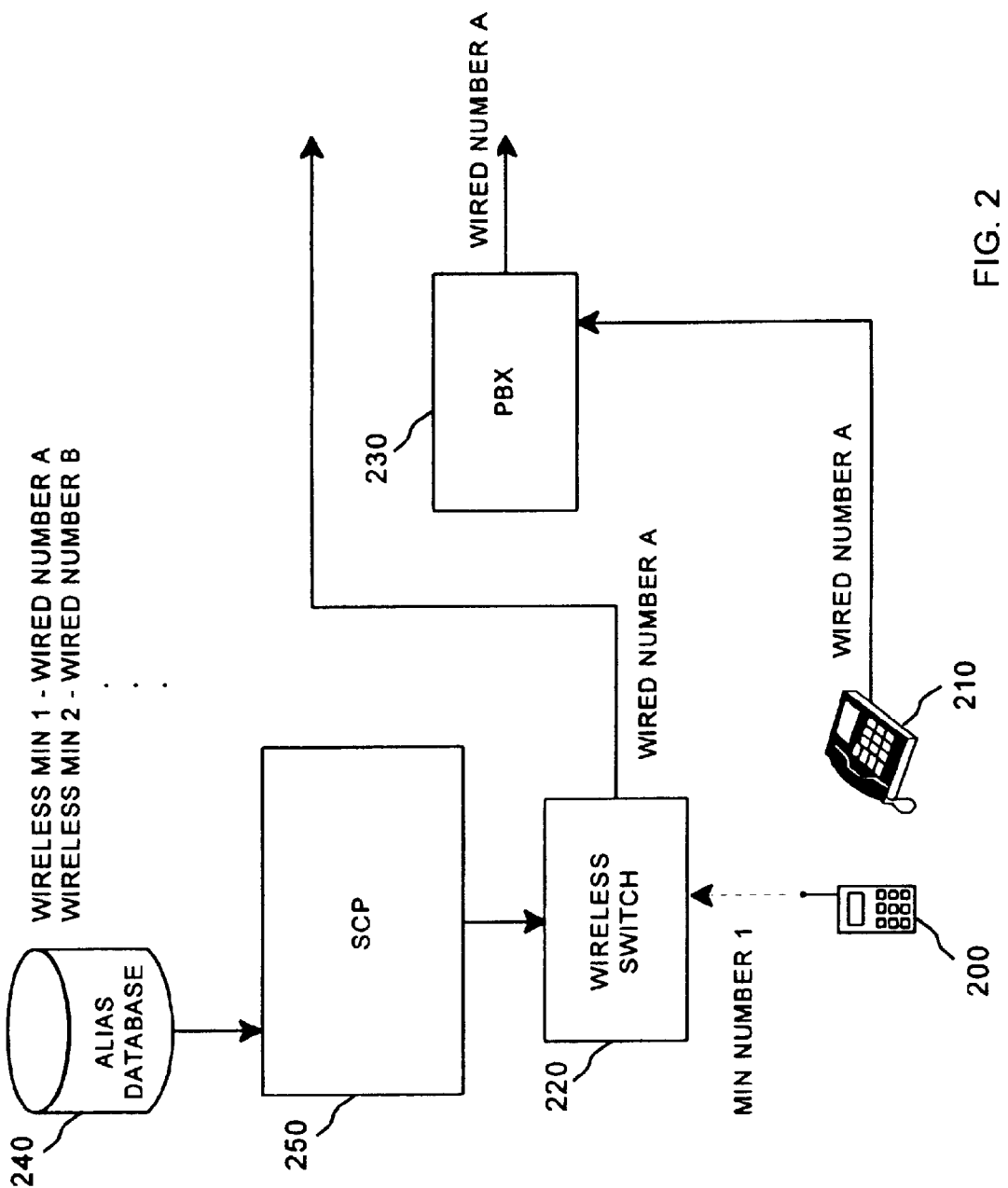
FIG. 2 is a block diagram illustrating how the system shown in FIG. 1 replaces a MIN with a CNI alias according to an embodiment of the present invention.

FIG. 2 is a block diagram illustrating how the system shown in FIG. 1 replaces a MIN with an alias when providing a CNI alias according to an embodiment of the present invention. The alias database 240 stores an association between the subscriber's wireless MIN and the subscriber's published, or "wired," telephone number. The alias database 240 could be associated with, for example, a Home Location Register (HLR) containing WOS subscriber profiles. Because the HLR is secure and profiles can typically only be modified by the network provider, such an arrangement would discourage subscribers from using a CNI alias for deceptive purposes.

When the subscriber places a call using the wireless telephone 200 via the wireless switch 220, the SCP 250 performs a database lookup to retrieve the wired number associated with the subscribers's MIN. For example, as shown in FIG. 2 a wireless MIN "1" is associated with a wired number "A." When the wireless switch 220 and the SCP 250 determine that a wireless call is being placed with the wireless MIN 1, the wired number A will be transmitted to the communications network 100 as the CNI. The wired number A will then be sent through the communications network (not shown in FIG. 2) as a CNI alias for the call.

The present invention could also be implemented such that the wired number A would also be used as a CNI alias for the wireless MIN 1 when the wireless telephone is used away from the wireless switch 220. In this case, another intelligent network node like the wireless switch 220 and SCP 250 could perform the database lookup when the call is made. The intelligent network node could use the same alias database 240, but another database containing similar information could be used instead.

Figure 3:
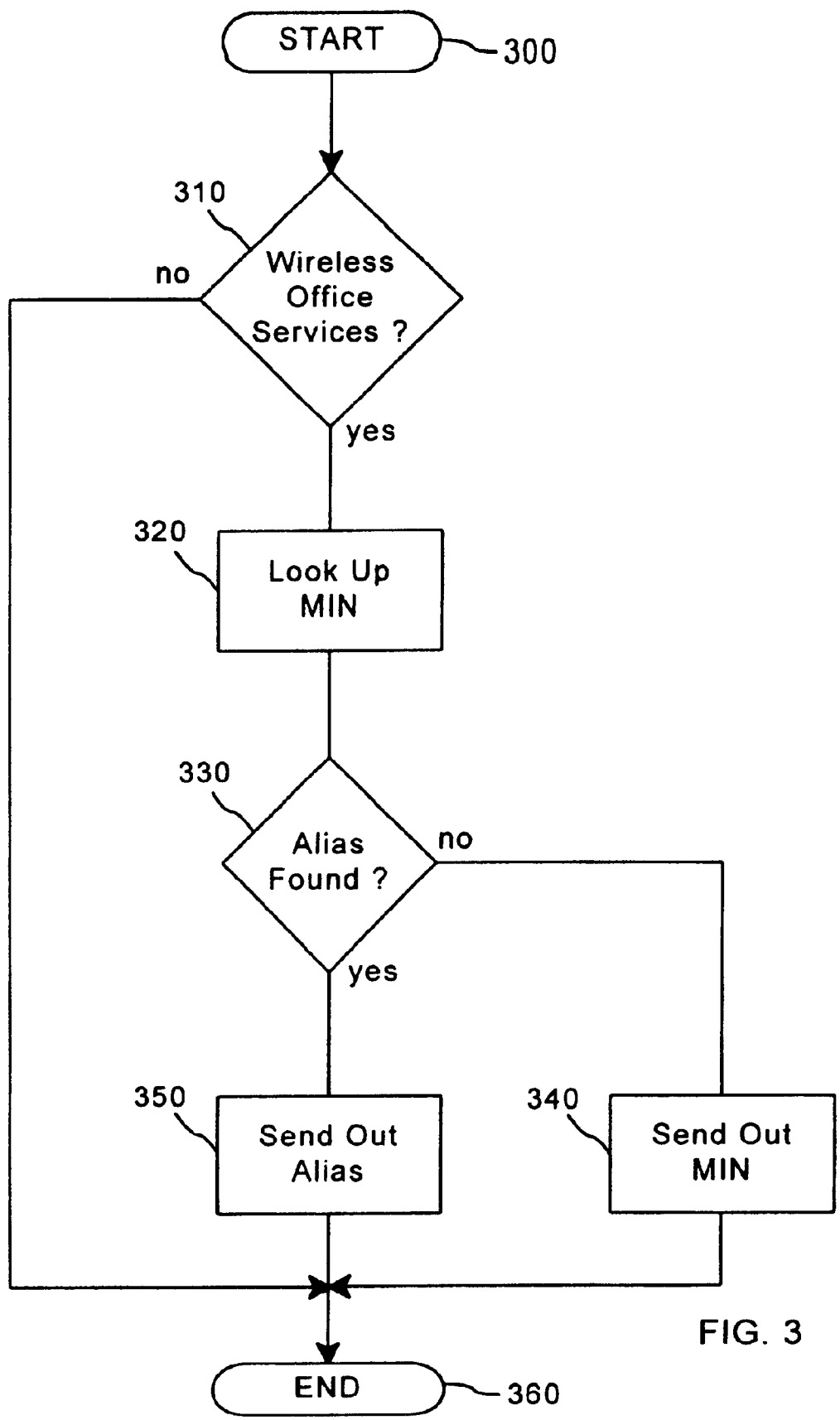
FIG. 3 is a block flow diagram of a process than can be used to provide a CNI alias for a wireless telephone according to an embodiment of the present invention.

FIG. 3 is a block flow diagram of a process than can be used to provide a CNI alias for a wireless telephone associated with a wired telephone according to an embodiment of the present invention. The process begins at step 300 when a phone call is processed. If the telephone call is not from a WOS communications system at step 310, the process ends at step 360. If the call is from a WOS communications system, the telephone number of the associated wired telephone is queried from an alias database at step 320. If an associated wired telephone number, or alias, is not found at step 330 the MIN is used as the CNI at step 340. If an alias is found at step 330, the alias is used as the CNI at step 350 before the process ends at step 360.

Although various embodiments are specifically illustrated and described herein, it will be appreciated that modifications and variations of the present invention are covered by the above teachings and within the purview of the appended claims without departing from the spirit and intended scope of the invention. For example, although a WOS communications system was used to illustrate various embodiments of the invention, it can be appreciated that other communications systems could also fall within the scope of the invention. Similarly, although the telephone number of the wired telephone was used as the alias, a third telephone number having a fixed relationship with the MIN of the wireless telephone could be used instead and still fall within the scope of the present invention.

What is claimed is:

1. A method to provide a calling number identifier for a wireless telephone associated with a wired telephone number, comprising:

processing a telephone call placed by a calling party from the wireless telephone, wherein the calling party wishes to provide information with respect to the wired telephone number in lieu of information with respect to the wireless telephone number; wherein processing the telephone call includes transmitting only a dialed number along with a wireless telephone number;

automatically searching an alias database for the wired telephone number associated with the wireless telephone number and the calling party; and transmitting the wired telephone number as the calling number identifier for the telephone call in lieu of the wireless telephone number.

2. The method of claim 1, wherein the wireless telephone and a wired telephone having the associated wired telephone number are part of a wireless office service communications system.

3. The method of claim 2, wherein said steps of searching and transmitting are performed when the telephone call is processed by a communications node other than a wireless switch associated with the home location of the wireless telephone.

4. The method of claim 1, wherein the alias database stores a plurality of wireless telephone numbers each associated with a wired telephone number.

5. The method of claim 2, wherein the alias database stores a plurality of mobile identification numbers each associated with a wired telephone number.

6. The method of claim 5, wherein said step of searching is performed using information stored in a home location register.

7. The method of claim 1, wherein said steps of searching and transmitting are performed at an intelligent network node.

8. The method of claim 7, wherein said steps of searching and transmitting are performed at a mobile switching office.

9. The method of claim 1, wherein said step of searching is performed at a service control point.

10. An apparatus to provide a calling number identifier for a wireless telephone associated with a wired telephone number to a called party, comprising:

a wireless switch coupled to a communications network and configured to route a telephone call placed by a calling party from the wireless telephone to the communications network; wherein the calling party wishes to provide information with respect to the wired telephone number in lieu of information with respect to the wireless telephone number;

an alias database associating the wired telephone number with a mobile identification number representing the wireless telephone and with the calling party; and a service control point coupled to the wireless switch and the alias database, the service control point configured to access the alias database to automatically substitute the wired telephone number as the calling number identifier of the telephone call from the wireless telephone to the called party without additional interaction by the calling party beyond placing the telephone call.

11. The apparatus of claim 10, wherein the wireless telephone and a wired telephone having the associated wired telephone number are part of a wireless office service communications system.

12. The apparatus of claim it, further comprising:

a private branch exchange coupled between said wireless switch and the communications network, and further coupled to the wired telephone, said private branch exchange configured to use the wired telephone number as the calling number identifier of a telephone call from the wired telephone.

13. An apparatus to provide a calling number identifier for a wireless telephone associated with a wired telephone number to a called party, comprising:

means for processing a telephone call placed by a calling party from the wireless telephone, wherein the calling party wishes to provide information with respect to the wired telephone number in lieu of information with respect to the wireless telephone number;

means for automatically searching an alias database for the wired telephone number associated with the wireless telephone and the calling party, wherein no interaction is required by the calling party beyond making the telephone call; and means for transmitting the wired telephone number as the calling number identifier for the telephone call to the called party.

14. The apparatus of claim 13, wherein the wireless telephone and a wired telephone having the associated wired telephone number are part of a wireless office service communications system.

15. The apparatus of claim 13, wherein the alias database stores a plurality of wireless telephone numbers each associated with a wired telephone number.

16. The apparatus of claim 13, wherein said means for searching is a service control point.

17. A method to provide a calling number identifier for a wireless telephone associated with a wired telephone number, comprising;

placing a telephone call by entering only a telephone number to be called from a wireless telephone, wherein the wireless telephone lacks alias associating software;

processing the telephone call placed by the wireless telephone, wherein processing the telephone call includes transmitting only a dialed number along wit a wireless telephone number;

automatically searching an alias database for the wired telephone number associated with the wireless telephone number; and transmitting the wired telephone number as the calling number identifier to a called party.

18. A method to provide a calling number identifier for a wireless telephone associated with a wired telephone number as in claim 17, wherein the wireless telephone number is a mobile identification number (MIN).

19. A method to provide a calling number identifier for a wireless telephone associated wit a wired telephone number as in claim 18, wherein the step of automatically searching an alias database includes replacing the mobile identification number (MIN) with a matched alias wired caller number identifier (CNI); and if no match is found in the alias database between the (MIN) and the stored alias (CNI)s, the (MIN) is automatically transmitted to the called party.

* * * * *

UNITED STATES PATENT AND TRADEMARK OFFICE
CERTIFICATE OF CORRECTION

PATENT NO. : 6,662,006 B2
DATED : December 9, 2003
INVENTOR(S) : David R. Glass

It is certified that error appears in the above-identified patent and that said Letters Patent is hereby corrected as shown below:

Column 5,
Line 18, "it" should be -- 11 --;

Column 6,
Line 12, ";" should be -- : --;
Lines 18 and 30, "wit" should be -- with --;

Signed and Sealed this

Twenty-eighth Day of June, 2005

JON W. DUDAS
*Director of the United States Patent and Trademark Office*